3,370,053
POLYMERIZATION OF OLEFINS IN THE PRESENCE OF AN ALKALI METAL ALUMINUM TETRAHYDROCARBON AND A ZIRCONIUM COMPOUND
Arthur William Anderson and William Lawrence Truett, Wilmington, Del., assignors to E. I. du Pont de Nemours and Company, Wilmington, Del., a corporation of Delaware
No Drawing. Continuation-in-part of application Ser. No. 787,328, Jan. 19, 1959, which is a continuation-in-part of application Ser. No. 450,268, Aug. 16, 1954. This application Mar. 9, 1965, Ser. No. 438,371
13 Claims. (Cl. 260—93.7)

This application is a continuation-in-part of our copending application, Ser. No. 787,328, filed Jan. 19, 1959, and now abandoned, which is, in turn, a continuation-in-part of our application, Ser. No. 450,268, filed Aug. 16, 1954, now abandoned.

This invention relates to novel catalyst systems which are highly valuable for the production of solid olefin polymers and copolymers. More particularly, this invention relates to a novel process for the production of solid polyolefins by the use of the novel catalyst systems.

Heretofore, it has been widely known that ethylene can be converted to solid polymers under very high pressures in the presence of catalysts which are capable of yielding free radicals under polymerization conditions.

It has also been known heretofore (U.S. Patents 2,212,155, 2,475,520, 2,467,234) that certain metal alkyls and Grignard reagents are capable of initiating the conversion of ethylene to solid polymers through a free radical mechanism. Ethylene has also been converted to solid polymers in the presence of hydrogenation catalysts, particularly in the presence of alkali metals or alkali metal hydrides (British Patent 536,102).

Generally speaking, Friedel-Crafts type catalysts have not been effective for converting ethylene to solid polymers but instead have resulted in the formation of liquid polymers from ethylene; however, it has recently been reported that solid polymers admixed with oils can be obtained by polymerizing ethylene in the presence of aluminum chloride and titanium chloride at elevated temperatures and pressures and advantageously in the presence of HCl-binding metals like aluminum powder (Fischer, German Patent 874,215, Ausgegeben, April 20, 1953).

In other publications such as U.S. Patents 2,389,240 and 2,355,925, there have been disclosed processes for the polymerization of low boiling olefinic hydrocarbons such as propylene, isobutylene, and the like, to lubricating oils in the presence of Friedel-Crafts catalysts including halides of aluminum, boron, zirconium, and other similar metal halides. In each of these disclosures, however, there is produce a relatively low boiling liquid polymer from an olefin containing 3 or more carbon atoms. Attempts to polymerize ethylene to solid polymers in the presence of zirconium tetrachloride (in which the average valence of the zirconium was not below 3) failed, and it was thus apparent that this prior art catalyst was not satisfactory for the polymerization of olefins generally.

Redox systems have frequently been disclosed for polymerization of olefinic compounds. In the past, redox systems have resulted in the formation of highly branched low density polymers, except at extremely high superpressures, at which high density ethylene polymers have been obtained heretofore. In many of these systems a heavy metal compound was employed in combination with a reducing component (cf. U.S. Patents 2,380,473 and 2,383,425). While various theories have been advanced as to the mechanism of polymerization in redox systems, the art of polymerizing olefins in the presence of such combinations of catalyst components has not heretofore advanced to the state at which predictions could be made as to which pairs of oxidizable and reducible components might give good results in the conversion of ethylene to solid polymers except, of course, by further experimentation.

It has been discovered in accordance with the present invention that extraordinary and highly useful effects are produced by bringing the reaction product of a polyvalent zirconium compound and an organometallic reducing agent into contact with hydrocarbons containing ethylenic unsaturation. In specific embodiments, it has been found that zirconium compounds in which the zirconium is combined with radicals such as alkoxy radicals, alkyl radicals, and radicals which form acids when combined with hydrogen, preferably zirconium halides, can be used effectively in the polymerization of ethylene, propylene, and higher 1-olefins.

The active catalytic form of zirconium is generally obtained by admixing a zirconium salt or a zirconate ester having a valence state of three or more with an organometallic reducing agent such as, for example, Grignard reagents or metal alkyls or aryls. The quantity of reducing agent which is present must be sufficient to convert the zirconium at least in part to a valence state of two and preferably to an average valence state of less than three ($<3.0$). Zirconium trichloride alone is ineffective for converting ethylene to solid polymers. On the other hand, zirconium dichloride is an effective catalyst for ethylene polymerization yielding solid polymers. A test for divalent zirconium, which defines the presence or absence thereof, is the ability of the divalent zirconium to react with liquid water to form hydrogen.

Coordination of the zirconium at a valence of less than three with organic substances does not necessarily destroy its ability as a catalyst nor destroy its ability to produce hydrogen upon reaction with liquid water; in fact, it appears that ethylene is capable of coordinating with the zirconium in this lower valence state, and quite possibly this phenomenon has a bearing on the mechanism of the polymerization. However, there is evidence, as explained hereinafter, that compounds which complex preferentially to the olefins tend to suppress the polymerization reaction.

The nature of these coordination complexes is not fully understood, except that it appears that at least some of the zirconium must be at a valence state of 2 to provide active catalysts or catalyst components which are capable of initiating the polymerization of olefins in an extremely active manner to produce solid, linear olefin polymers. Furthermore, in particular instances, the organic radical which is combined in the coordination complex may provide end groups for the solid olefin polymer.

The zirconium catalyst complexes are difficult to isolate in a pure state, but they are stable in the form of dispersions or solutions in hydrocarbon solvents. The catalytic complex is formed almost instantaneously on combination of the two components in a liquid hydrocarbon medium and is independent of the temperature at which the components are combined.

The density of the ethylene polymers obtained through the use of these coordination complexes generally exceeds, at least to some extent, the density of polyethylene prepared by the use of free radical types of catalysts except those free radical polymerization processes which employ such extremely high pressures as to produce abnormally high density polyethylene as compared with polyethylene made at moderately high pressure (700 to 1200 atmospheres) by a free radical polymerization process (cf. U.S. Patent 2,586,322).

While the polymerization of ethylene and higher 1-olefins to produce solid polymers in the presence of the catalysts herein disclosed can be carried out under extremely mild conditions, it is preferable from an economic standpoint to employ moderately high pressures, suitably from 1 to 200 atmospheres or higher, but preferably from about 35 to 170 atmospheres (500 to 2500 p.s.i.) in order to facilitate the handling of the olefin. Much higher pressures, up to several thousand atmospheres, can be employed, but it is not desirable to do this in view of the extraordinary activity of the catalysts at lower pressures. Similarly, extremely low temperatures may be employed. The preferred temperatures are within the range of about 0° C. to 300° C.

The polymerization of ethylene and other 1-olefins according to the process of this invention, takes place most satisfactorily when the polymerization mixture is substantially free of moisture and other sources of hydroxyl groups, and substantially free of carbon dioxide. As in numerous other ethylene polymerization processes, the polymerization mixture in the process of this invention is preferably kept free of oxygen since oxygen reacts with the catalyst. In practical operations the oxygen content should preferably be held below 20 parts per million.

Certain organic solvents which are capable of coordinating with the activated zirconium catalyst form complexes which are too stable for optimum results when using the catalyst in the polymerization of 1-olefin and, accordingly, the presence of these compounds should preferably (although not necessarily) be avoided. In this category are ketones and esters. Hydrocarbon solvents, on the other hand, can be used quite effectively as reaction media. Preferably, the hydrocarbons used as solvents for the reaction medium are the unsubstituted aliphatic, cycloaliphatic or aromatic hydrocarbons having 3–10 carbon atoms per molecule. Thus in the polymerization of propylene and higher 1-olefins, the liquid hydrocarbon medium can be the olefin itself if the pressure and temperature are such that it is in the liquid phase in the reaction zone.

The novel catalysts described herein are preferably used in dissolved or colloidally dispersed form. The active zirconium complex may be prepared in a separate and prior step where an inert hydrocarbon solvent is employed as the liquid medium. In the latter case, it is advisable to keep the catalyst complex at a temperature of about 0° C. and free from contamination with water or air so as to avoid decomposition of the complex.

The invention is illustrated further by means of the following examples:

EXAMPLE 1.—*Polymerization of ethylene using a dry solid catalyst*

Zirconium tetrachloride (0.1 mole) and phenyl magnesium bromide (0.4 mole) were mixed in 400 cc. of cyclohexane at room temperature. The solid precipitate which formed was filtered, dried at room temperature and 1 mm. absolute pressure and thereafter stored under nitrogen until ready for use. This solid material was used as dry catalyst in subsequent experiments as described below.

A mixture of 3 grams of the above-described dry catalyst was introduced into 100 cc. of cyclohexane in a 325 cc. shaker tube, the tube pressured to 500 p.s.i. of ethylene, and the mixture shaken at room temperature for two hours. The resulting solid polymer was washed in a Waring Blendor with methanol in hydrochloric acid, followed by a wash with acetone. The polymer produced weighed 38 grams in a dry form and exhibited the following properties: density, 0.93, inherent viscosity (in decalin at 125° C.), 11.9 and 10.8 as measured in two determinations.

In a similar run 100 cc. of the filtrate recovered in the preparation of the dried catalyst, as described above, was employed as the catalyst in the polymerization of ethylene under the same conditions as described above. The weight of the polymer produced was 1 gram; the polymer exhibited a density of 0.99. The inherent viscosity of the polymer could not be determined because the polymer was insoluble.

Similar results are obtained by using other zirconium halides in the process of this example. Other zirconium halides found to be operable in this process include zirconium tetrafluoride, zirconium tetrabromide and zirconium tetraiodide.

EXAMPLE 2.—*Polymerization of propylene using a dry solid catalyst*

A mixture of 5 grams of the dry catalyst prepared in Example 1 and 100 cc. of cyclohexane was introduced into a 325 cc. shaker tube along with 50 grams of propylene. Three identical mixtures were prepared in this manner and were shaken for two hours, the first at −50° C., the second at room temperature, and the third at 100° C. There was only a slight trace of solid polymer produced in the first tube, approximately 0.1 gram of solid polymer in the second tube, and slightly less than 0.1 gram in the third tube.

When 0.01 mole of zirconium tetrachloride was used as the sole catalyst without being reduced by phenyl magnesium bromide, there was not obtained any solid polymer of propylene, but only low molecular weight oils and greases.

EXAMPLE 3.—*Polymerization of ethylene using a liquid catalyst mixture*

Into a 500 cc. vessel there was charged 200 cc. of cyclohexane, 0.01 mole of zirconium tetrachloride, and 0.04 mole of phenyl magnesium bromide. The product was a black mixture of liquid and finely suspended particles. This mixture was charged into a shaker tube, pressured with 500 p.s.i. of ethylene, and shaken for two hours at 30° C. The resulting polymer, after being dried, weighed 35.0 grams and had a density of 0.94. The inherent viscosity could not be measured because the polymer solution formed a gel.

In a similar example using allyl magnesium bromide in place of phenyl magnesium bromide, substantially identical results were obtained.

In another similar example in which chlorobenzene was employed as a reaction mixture in place of cyclohexane, substantially identical results were obtained.

EXAMPLE 4.—*Polymerization of ethylene using a liquid catalyst mixture*

Into a shaker tube there was charged 0.01 mole of zirconium tetrachloride, 0.03 mole of ethyl magnesium bromide as a solution in diethyl ether, and 100 cc. of n-heptane. The shaker tube was pressured with 2500 p.s.i. of ethylene and shaken for 3 hours at 160° C. The solid polymer which formed weighed approximately 50 grams after washing and drying, had a density of 0.95, and could not be extruded in a melt index machine at 190° C. because of the high molecular weight of the polymer.

EXAMPLE 5.—*The effect of changing the amount of zirconium salt*

In a series of three experiments, zirconium tetrachloride was charged into a shaker tube along with 0.03 mole of ethyl magnesium bromide as a solution in diethyl ether, and 100 cc. of cyclohexane. The amount of zirconium tetrachloride which was employed was 0.01 mole in the first tube, 0.02 mole in the second tube, and 0.03 mole in the third tube. Each of the tubes were pressured with 2500 to 2600 p.s.i. of ethylene and were shaken for 1¼ to 1½ hours at 200° C. The amount of polymer produced was 2.0 grams in the first tube, 0.42 gram in the second tube, and 3.99 grams in the third tube. The properties of each of the three polymers were essentially identical in that they had a density of 0.94 and an inherent viscosity of 2.45 to 2.66 and could be formed into tough films by pressing a portion of the polymer at 200° C. under 20,000 p.s.i. for three minutes.

EXAMPLE 6.—*Polymerization of ethylene using a zirconate catalyst*

Into a 330 ml. shaker tube there was charged 0.01 mole of tetraethyl zirconate, 0.03 mole of phenyl magnesium bromide (as a 3 molar solution in diethyl ether), and 100 ml. of benzene. The shaker tube was pressured with 1000 p.s.i. of ethylene and shaken for 1 hour at 100° C. The solid polymer which was recovered after washing and drying weighed more than 25 grams and exhibited a greater stiffness than known commercial grades of polyethylene.

EXAMPLE 7.—*Polymerization of ethylene employing $ZrCl_4$ with an aluminum alkyl*

Into a 330 ml. shaker tube there was charged 0.01 mole of zirconium tetrachloride, 0.02 mole of lithium aluminum tetrabutyl, and 100 ml. of cyclohexane. The shaker tube was pressured with 1000 p.s.i. of ethylene and shaken for 1 hour at 75° C. The solid polymer which was recovered after washing and drying weighed more than 25 grams and exhibited a greater stiffness than known commercial grades of polyethylene.

It is to be observed that the foregoing examples are illustrative only and that numerous embodiments of the invention will occur to those who are skilled in the art.

The zirconium salt used in the processes of the invention may be any zirconium halide in which the zirconium is at a valence state of three or four, since all of such halides are operable in the process of this invention. Such halides include, for example, zirconium tetrafluoride, zirconium tetrachloride, zirconium tetrabromide, zirconium tetraiodide, zirconium trifluoride, zirconium trichloride, zirconium tribromide, zirconium triodide, zirconyl difluoride, zirconyl dichloride, zirconyl dibromide, and zirconyl diiodide. The process of this invention is also operable with mixed halides, for example, zirconium dichloridedibromide, zirconium fluoridetribromide.

The zirconate esters which are operable in the processes of this invention as illustrated by the foregoing examples include tetramethyl zirconate, tetraethyl zirconate, tetrapropyl zirconate, tetrabutyl zirconate, tetraamyl zirconate, tetrahexyl zirconate, dimethyldiethyl zirconate, butyltrimethyl zirconate, and the like.

The above zirconium salts and zirconate esters when used as a component of the polymerization catalyst or initiator in the process of this invention must be combined with an organometallic reducing agent, desirably in amounts stoichiometrically sufficient to reduce the average valence of the zirconium in the salt or ester to less than three.

The reducing agents employed in this process are any of several well-known varieties of compounds. In general, the reducing agent is an organometallic compound having at least one metal-to-hydrocarbon bond. Such compounds include, without limitation thereto, the Grignard reagents, metal alkyls and aryls, including without limitation thereto, the alkali metal aluminum tetrahydrocarbons, zinc dihydrocarbon, cadmium dihydrocarbon, and mercury dihydrocarbon. The Grignard reagents are of the general formula $RMX_{n-1}$ where R is a hydrocarbon group, M is a metal, X is a halogen, and $n$ is the valence of metal M. Grignard reagents are compounds such as methylmagnesium iodide, ethylmagnesium bromide, propylmagnesium chloride, butylmagnesium fluoride, phenylmagnesium bromide, and allyl magnesium bromide. The alkali metal aluminum tetrahydrocarbons include lithium aluminum tetrabutyl, sodium aluminum tetraethyl, potassium aluminum tetrahexyl, and the like. Preferably, the hydrocarbon groups of the alkali metal aluminum tetrahydrocarbon should contain from 1 to about 18 carbon atoms. The hydrocarbon group may be alkyl, cycloalkyl, or aryl.

The catalyst of the process of this invention is a reaction product of a zirconium salt or a zirconate ester with an organometallic reducing agent. Typical catalysts are the reaction products of zirconium tetrachloride and lithium aluminum tetrabutyl, zirconium tetrachloride and phenylmagnesium bromide, tetraethyl zirconate and tetrabutyltin, zirconium trichloride and sodium aluminum tetraethyl, zirconium tetrabromide and tetrahexyl lead, tetrabutyl zirconate and diphenylcadmium, zirconium tetrafluoride and potassium aluminum tetraphenyl, zirconium tetraiodide and lithium aluminum tetradecyl, and zirconyl dichloride and lithium aluminum tetraoctyl.

The quantity of catalyst employed can be varied over a rather wide range. It is desirable to employ a quantity of catalyst which is at least large enough to produce a reasonably rapid rate of polymerization for a reasonably long period of time. Suitably, the preferred quantity is within the range of 0.1% to 10% based on the weight of Zr per unit weight of monomer.

For the formation of the active catalyst complex, the quantity of the reducing agent which is present must be sufficient to convert the zirconium at least in part to a valence state of two. In order to achieve this, the proportion of zirconium salt or zirconate ester to the organometallic reducing agent are preferably such that there is enough reducing agent to reduce the average valence of the zirconium to less than three. Depending upon the initial valence of the Zr and upon the reducing power of the organometallic compound, the process of this invention employs from about 0.5 to about 10 mols of the organometallic reducing agent per mol of the zirconium compound in forming the active catalyst complex.

The polymers which are made under the conditions hereinabove described frequently have such tremendously high molecular weights that removal of catalyst by dissolving and filtering is extremely difficult. One procedure for obtaining the polymer in a clean form is to wash with acetone-hydrochloric acid mixture in a Waring Blendor several times followed by washing with acetone and thereafter, if necessary, followed by several acetone-aqueous sodium hydroxide washes and finally by acetone-water wash. Finally, the polymer can be washed with acetone. The polyethylene products thus obtained are generally snow-white. While this procedure is highly satisfactory for preparing clean polymer, it is to be understood that simpler procedures, such as treatment with water at elevated temperatures, will be entirely suitable for various practical applications. For other applications it is not essential to remove traces of catalyst.

The structure of the polyethylene made in accordance with the process of this invention evidently is characterized by being a straight chain hydrocarbon, with vinyl groups at one or both ends of at least some of the molecules. The infrared measurements indicate very little methyl substitution and a very small number of vinylidene groups with little or no transunsaturation or carbonyl groups.

The ethylene polymers obtained in accordance with the process of this invention are highly valuable in numerous applications especially in the form of films, fibers, molded articles, extruded insulation on wire, etc. Even in those embodiments in which the catalyst is not removed from the polymeric product or is only incompletely removed, the products are nevertheless thermally stable, somewhat surprisingly. When the polymerization is carried out in a system in which the catalyst is dissolved in the inert medium (e.g. when the zirconate ester contains octyl groups or other similar groups or when it contains methyl groups but the reducing agent contains phenyl, octyl or other similar group which can interchange with methyl) the polymer precipitates from the polymerization mixture in a form which may contain measurable amounts of zirconium, e.g. as much as 0.5%. Such compositions are highly useful despite their content of zirconium.

As pointed out above ethylene is not the only olefin that may be polymerized by the catalysts and processes of this invention. Other ethylenically unsaturated monomers, such as propylene, butene-1, hexene-1, butadiene, styrene, and the like are polymerized to solid polymers by the use of the zirconium catalyst complex in the process of this invention. Also the process of this invention is useful not only in the manufacture of olefin homopolymers but is effective also in the manufacture of copolymers, such as ethylene-propylene copolymers, when applied to mixtures of ethylenically unsaturated hydrocarbon monomers.

What is claimed is:

1. The process of preparing solid polymers from ethylenically unsaturated hydrocarbon monomers which comprises contacting an ethylenically unsaturated hydrocarbon monomer in a liquid hydrocarbon medium at a temperature of from 0° to 300° C. and a pressure of from 1 to 200 atmospheres with a catalyst complex which comprises zirconium at least in part at a valence state of 2, said catalyst complex being the reaction product of a zirconium compound, in which the zirconium was at a valence state of at least 3, with from 0.5 to 10 mols, per mol of zirconium compound of an organometallic reducing agent, selected from the group consisting of alkali metal aluminum tetrahydrocarbons, said zirconium compound being selected from the group consisting of zirconium halides and zirconium alkoxides, and recovering from said liquid hydrocarbon medium a solid polymer of said ethylenically unsaturated hydrocarbon.

2. The process of claim 1 in which the zirconium compound is zirconium tetrachloride.

3. The process of claim 1 in which the ethylenically unsaturated hydrocarbon monomer is ethylene.

4. The process of claim 1 in which the ethylenically unsaturated hydrocarbon monomer is propylene.

5. The process of claim 1 in which the zirconium in the catalyst complex is at an average valence state below 3.0.

6. The process of preparing solid polyethylene which comprises contacting ethylene in a liquid hydrocarbon medium at a temperature of from 0° to 300° C. and a pressure of from 35 to 170 atmospheres with a catalyst complex which comprises zirconium at an average valence state below 3 and at least in part at a valence state of 2, said catalyst being the reaction product of a zirconium chloride, in which the zirconium was at a valence state of at least 3, with from 0.5 to 10 mols, per mol of zirconium chloride, of an organo-metallic reducing agent selected from the group consisting of alkali metal aluminum tetrahydrocarbons, and recovering from said liquid hydrocarbon medium a solid polyethylene.

7. A process according to claim 6 in which the organo-metallic reducing agent is lithium aluminum tetrabutyl.

8. The process of claim 6 in which the zirconium chloride is zirconium tetrachloride.

9. The process of preparing solid polypropylene which comprises contacting propylene in a liquid hydrocarbon medium at a temperature of from 0° to 300° C. and a pressure of from 1 to 200 atmospheres with a catalyst complex which comprises zirconium at least in part at a valence state of 2, said catalyst being the reaction product of a zirconium chloride, in which the zirconium was at a valence state of at least 3, with from 0.5 to 10 mols, per mol of zirconium chloride, of an organometallic reducing agent selected from the group consisting of alkali metal aluminum tetrahydrocarbons, and recovering from said liquid hydrocarbon medium a solid polypropylene.

10. The process of claim 9 in which the organo-metallic reducing agent is lithium aluminum tetrabutyl.

11. The process of claim 9 in which the zirconium in the catalyst complex is at an average valence state below 3.0.

12. The process of claim 9 in which the zirconium chloride is zirconium tetrachloride.

13. The process of claim 1, in which the organo-metallic reducing agent is lithium aluminum tetrabutyl.

References Cited

UNITED STATES PATENTS

| | | | |
|---|---|---|---|
| 3,113,115 | 12/1963 | Ziegler | 260—94.9 |
| 3,231,515 | 1/1966 | Ziegler | 260—94.9 |

JOSEPH L. SCHOFER, Primary Examiner.

F. L. DENSON, M. B. KURTZMAN,
Assistant Examiners.